US012750133B2

(12) United States Patent
Healy et al.

(10) Patent No.: US 12,750,133 B2
(45) Date of Patent: Sep. 29, 2026

(54) SATELLITE COMMUNICATIONS TUNNELING PROTOCOL FOR A SPACE MESH NETWORK

(71) Applicant: Dell Products L.P., Round Rock, TX (US)

(72) Inventors: Michael Healy, Scituate, MA (US); Qing Ye, Hopkinton, MA (US)

(73) Assignee: Dell Products L.P., Round Rock, TX (US)

( * ) Notice: Subject to any disclaimer, the term of this patent is extended or adjusted under 35 U.S.C. 154(b) by 336 days.

(21) Appl. No.: 18/633,469

(22) Filed: Apr. 11, 2024

(65) Prior Publication Data

US 2025/0323719 A1 Oct. 16, 2025

(51) Int. Cl.
*H04B 7/185* (2006.01)
*H04L 12/46* (2006.01)

(52) U.S. Cl.
CPC ..... *H04B 7/18586* (2013.01); *H04L 12/4633* (2013.01)

(58) Field of Classification Search
None
See application file for complete search history.

(56) References Cited

U.S. PATENT DOCUMENTS

2020/0252123 A1* 8/2020 Boutillon ........... H04B 7/18521
2020/0358704 A1* 11/2020 Anafi ................... H04B 17/336
2022/0345210 A1* 10/2022 Palermo ............. H04B 7/18584
2023/0247506 A1* 8/2023 Xu .................... H04W 36/0064 370/331
2024/0195487 A1* 6/2024 Wang ................. H04B 7/18521

OTHER PUBLICATIONS

Lin et al., "5G from Space: An Overview of 3GPP Non-Terrestrial Networks", IEEE Communications Standards Magazine, Dec. 2021, pp. 147-153.

(Continued)

*Primary Examiner* — Saumit Shah
(74) *Attorney, Agent, or Firm* — Amin, Turocy & Watson, LLP

(57) ABSTRACT

A system can communicate, by a satellite, with a user equipment according to a defined wireless communication protocol, and receive a radio-frequency communication from the user equipment via a satellite service link. The system can perform a programmable band-pass filter on the radio-frequency communication to produce a filtered communication. The system can perform an analog-to-digital conversion on the filtered communication to produce a digital communication. The system can create a packet header for the digital communication. The system can encapsulate the digital communication with the packet header to produce an encapsulated digital communication. The system can transmit the encapsulated digital communication to a first next-hop satellite via an inter-satellite link, wherein the inter-satellite link comprises a communication mode, and wherein the first next-hop satellite is configured to transmit the encapsulated digital communication to the terrestrial base station or to a second next-hop satellite.

20 Claims, 11 Drawing Sheets

(56) References Cited

OTHER PUBLICATIONS

3GPP TR 38.821 V16.2.0, "3rd Generation Partnership Project; Technical Specification Group Radio Access Network; Solutions for NR to support non-terrestrial networks (NTN) (Release 16)", Mar. 2023, 140 pages.
Rohde & Schwarz, "5G NTN Takes Flight: Technical Overview of 5G Non-Terrestrial Networks", White Paper, Jul. 2022, 124 pages.
"Facts and Figures 2021: 2.9 Billion People Still Offline", ITU Hub, Nov. 29, 2021, 3 pages.
Coffey, Joseph., "White Paper: Latency in Optical Fiber Systems", Commscope, 2017, 7 pages.
Physics, "How Fast Does Light Travel Through a Fibre Optic Cable?", Physics Stack Exchange, Online available at URL: https://physics.stackexchange.com/questions/80043/how-fast-does-light-travel-through-a-fibre-optic-cable, retrieved from the internet on Dec. 13, 2024, 4 pages.
Miller, Kevin, "Calculating Optical Fiber Latency (m2optics.com)", M2 Optics, Inc., Jan. 9, 2012, Online available at URL: https://www.m2optics.com/blog/bid/70587/calculating-optical-fiber-latency, retrieved from the internet on Dec. 13, 2024, 9 pages.
Wikipedia, "Speed of Light", Online available at URL: https://en.wikipedia.org/wiki/Speed_of_light, retrieved from the internet on Dec. 13, 2024, 36 pages.
Wikipedia, "Optical Fiber", Online available at URL: https://en.wikipedia.org/wiki/Optical_fiber, retrieved from the internet on Dec. 13, 2024, 28 pages.
Stein, Vicky, "How Fast Does Light Travel? | The Speed of Light", Space, Online available at URL: https://www.space.com/15830-light-speed.html, retrieved from the internet on Dec. 13, 2024, 16 pages.
"SpaceCraft Solution" Blue Canyon Technologies, Online available at URL: https://www.bluecanyontech.com/spacecraft, retrieved from the internet on Dec. 13, 2024, 9 pages.
Honeywell, "Optical Inter-Satellite Link Communication Terminal", Online available at URL: https://aerospace.honeywell.com/us/en/products-and-services/product/hardware-and-systems/space/optical-inter-satellite-link-comm-terminal, retrieved from the internet on Dec. 13, 2024, 3 pages.
"Broadband 101", Internet For All, Fall 2022, 42 pages.
"Components" Blue Canyon Technologies. [https://www.bluecanyontech.com/components/] retreived Jul. 15, 2025, 11 pages.

* cited by examiner

SATELLITE COMMUNICATIONS TUNNELING PROTOCOL FOR A SPACE MESH NETWORK

BACKGROUND

There can be Terrestrial Networks (TNs), and Non-Terrestrial Networks (NTNs).

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can communicate, by a satellite of a constellation of inter-satellite-linked satellites, with a user equipment according to a defined wireless communication protocol. The system can receive a radio-frequency communication from the user equipment via a satellite service link, wherein the radio-frequency communication is directed to a ground non-terrestrial network gateway for termination at a terrestrial base station. The system can perform a programmable band-pass filter on the radio-frequency communication to produce a filtered communication. The system can perform an analog-to-digital conversion on the filtered communication to produce a digital communication. The system can create a packet header for the digital communication. The system can encapsulate the digital communication with the packet header to produce an encapsulated digital communication. The system can transmit the encapsulated digital communication to a first next-hop satellite of the constellation of inter-satellite-linked satellites via an inter-satellite link, wherein the inter-satellite link comprises a communication mode, and wherein the first next-hop satellite is configured to transmit the encapsulated digital communication to the terrestrial base station or to transmit the encapsulated digital communication to a second next-hop satellite of the constellation of inter-satellite-linked satellites.

An example method can comprise receiving, by a first satellite, a radio-frequency communication from a user equipment via a satellite service link, wherein the radio-frequency communication is directed to terminate at a terrestrial base station. The method can further comprise encapsulating, by the first satellite, the radio-frequency communication with a packet header to produce an encapsulated communication, wherein the packet header corresponds to a first protocol, and wherein the radio-frequency communication corresponds to an internet protocol frame payload. The method can further comprise transmitting, by the first satellite, the encapsulated communication to a second satellite via an inter-satellite link, wherein the inter-satellite link comprises a communication mode, and wherein the second satellite is configured to transmit the radio-frequency communication to the terrestrial base station or to transmit the encapsulated communication to a third satellite.

An example non-transitory computer-readable medium can comprise instructions that, in response to execution, cause a system comprising a processor to perform operations. These operations can comprise receiving a radio-frequency communication from a user equipment on a satellite service link, wherein the radio-frequency communication is directed to terminate at a terrestrial base station. These operations can further comprise encapsulating the radio-frequency communication with a packet header to produce an encapsulated communication, wherein the packet header corresponds to a first protocol and wherein the radio-frequency communication corresponds to a packet payload. These operations can further comprise transmitting the encapsulated communication to a first satellite via an inter-satellite link, wherein the inter-satellite link comprises a communication mode, and wherein the first satellite is configured to transmit the radio-frequency communication to the terrestrial base station or to transmit the encapsulated communication to a second satellite.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

Figure 1:
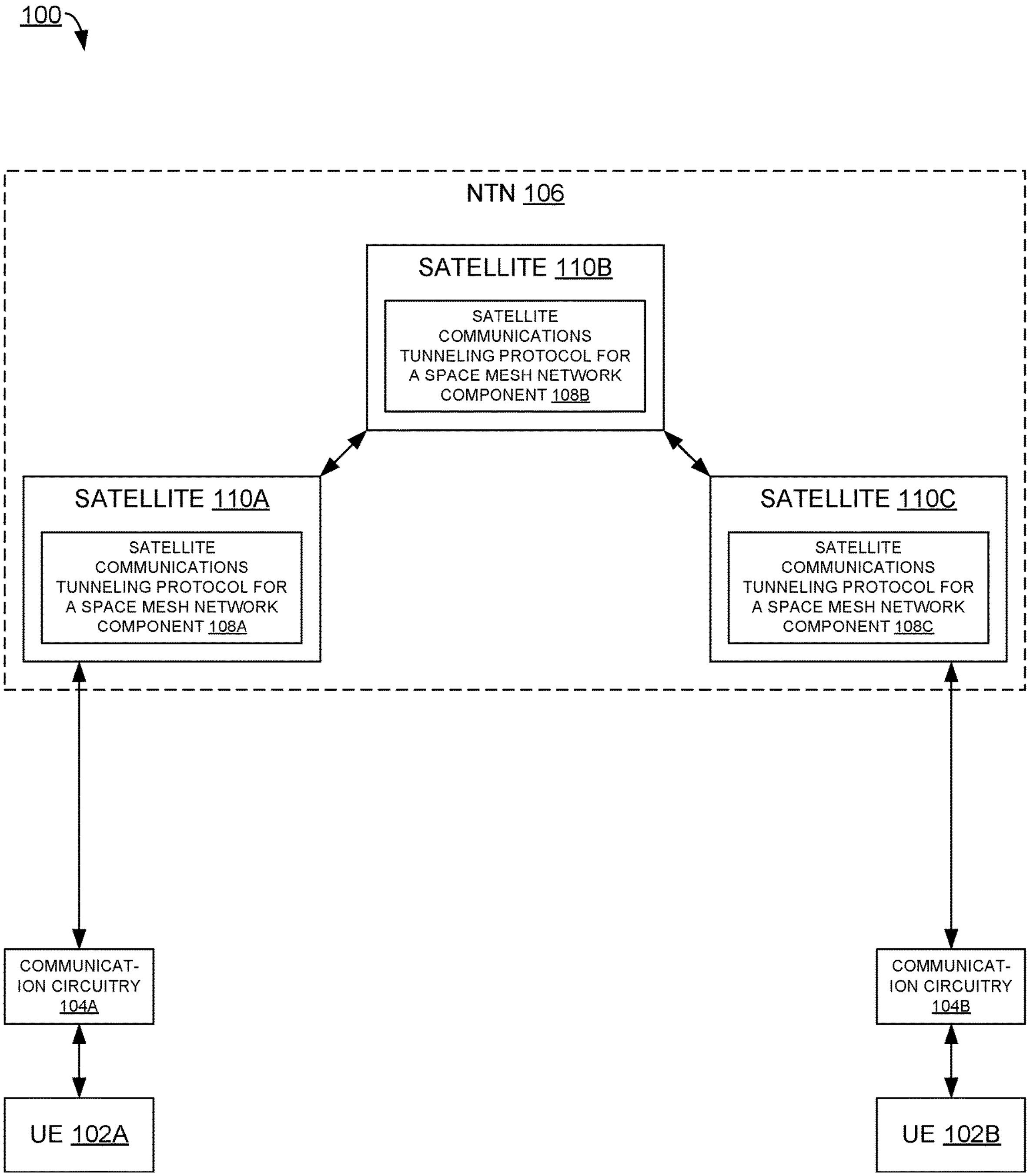
FIG. 1 illustrates an example system architecture that can facilitate a satellite communications tunneling protocol for a space mesh network, in accordance with an embodiment of this disclosure.

While the examples herein generally relate to 5G NR communications networks, it can be appreciated that the present techniques can be applied to other types of communications networks.

The mobile telecommunication industry can be quickly embracing a Non-Terrestrial Network (NTN) market due to its opportunity to fill in voids in their Terrestrial Networks (TN) radio frequency (RF) coverage. This opportunity to “fill in” no coverage locations is providing a ubiquitous TN+NTN network across the globe.

In the last few years, low earth orbit (LEO) satellites have begun to process mobile network operators (MNO) workloads on their LEO constellations. It can be that this migration to NTN resources is not expected to stop and will greatly increase with the new push to sixth generation (6G) networks, where TN and NTN merging can be agreed upon across the industry.

There can be problems with ground networks, space mesh networks, and underserved broadband communities. A problem can relate to packet propagation times. Packet propagation times across continents and through legacy ocean submarine fiber-optic cables can be considered a network “highway,” while packet travel through a space mesh network can be considered a “super-highway.” The present techniques can be implemented to provide an onramp to this super-highway of global communications. With prior techniques, a fastest global communication path can be through a ground fiber optic backbone and ocean submarine fiber optic background. With the present techniques, a new route can be made across a space mesh network, with a faster speed.

Relative to prior approaches, implementations of the present techniques can offer a dramatic reduction in latency, such as, in some examples, half the time that a legacy fiber-optic/submarine-fiber path takes. This reduction in latency can provide an advantage over prior approaches, particularly where a relatively-high latency presents a problem to achieving a desired goal.

Another problem can relate to infrastructure. In prior Non-Terrestrial Networks (NTNs) 3$^{rd}$ Generation Partnership Project (3GPP) transparent-mode (bent-pipe) architectures, there can be significant amounts of ground NTN gateways, and this infrastructure can carry large real-estate, building, and equipment costs. This can be because a satellite is only delivering bent-pipe mode, repeating a radiofrequency (RF) signal entering the satellite through its service link, and exiting the satellite through its feeder link. This can mean that, at any given moment, as the low-earth orbit (LEO) satellite flies by, it can need to be able to see the user equipment (UE) and the NTN gateway, and this can be a large and expensive constraint. The present techniques can be implemented to facilitate a new architecture, where a space mesh network operates as a “virtual NTN gateway” that steers a 5$^{th}$ Generation New Radio over Internet Protocol (5GNR-o-IP) digital packet to NTN gateways across the globe, without requiring line-of-sight to a satellite that the UE is simultaneously communicating with. This approach can save on satellite provider capital expenses. With the present techniques, costly NTN gateways can be geographically located much further away from the UEs, significantly dropping the investment cost.

Another problem can relate to compatibility. It can be that a ground network and a space mesh network are independent and incompatible with each other. The present techniques can mitigate against this problem by facilitating a digital tunneling protocol, which can bridge incompatible industries.

It can be that, using a 3GPP Transparent-Mode with prior approaches, the packets can never be routed through the Optical/RF ISL interfaces and space mesh network. The present technique can facilitate a mechanism to route 3GPP Transparent-Mode packets through a space mesh network (ISL). Additionally, in some examples, the present techniques can be implemented on deployed/currently-orbiting/legacy satellites.

Another problem can relate to lack of broadband. It can be estimated that, 50% of under-served communities are currently unable to receive broadband internet service. NTNs can fill in these connection holes. The present techniques can be implemented to facilitate serving these under-served communities by a satellite broadband provider.

Another problem can relate to compatibility issues with legacy satellites. It can be that mobile network operators (MNOs) are implementing Terrestrial Networks (TNs) using a Standards Development Organization (SDO) from the 3GPP. Then, it can be that satellite providers deployed satellites 15 years ago, long before current 3GPP 5G NR specifications. There can be serious compatibility issues with legacy satellites. The present techniques can be implemented to facilitate merging a 3GPP 5G NR standard air interface with legacy, deployed satellite assets and constellations.

Another problem can relate to architectures used by satellite providers. It can be that satellite providers generally build and deploy satellites without reference to 3GPP standards organization working groups. Rather, they can have their own previously-followed radio architecture, and can be deploying their satellites like they did in the past. Then it can be that, now, they are trying to overlay 5G NR MNO opportunities after their constellations have been built and deployed. The present techniques can be implemented to facilitate satellite providers taking advantage of the proliferation of 5G technologies.

The present techniques can be implemented to solve problems in the telecommunications industry where over-the-air mobile Terrestrial Network (TN) providers are merging with satellite Non-Terrestrial Network (NTN) providers. A challenge can be that these two very different industries have never collaborated, or shared standards organization specifications in the past.

Today, MNOs can partner with satellite providers to provide merged mobile TN and satellite (NTN) commercial offerings. A product offering can be called direct to device (D2D), where normal off the shelf cellphones, notebook computers, and other user equipment, communicates directly with a satellite, providing global coverage.

The present techniques can be implemented to merge mobile (TN) and satellite (NTN) markets. The present techniques can be implemented to facilitate a digital tunneling protocol, which can bridge incompatible industries. Adopting this packet structure can speed up a merge between TN and NTN markets.

3GPP Release 16/17/18 can support NTN with two modes: transparent-mode and regenerative-mode. The present techniques can be used with transparent-mode, thus enabling features of the present techniques. 3GPP transparent-mode can be defined in the 3GPP specifications, and it can be that satellite providers have already deployed thousands of satellites capable of using transparent-mode. It can be that 3GPP regenerative-mode is not well-defined, and is making its way through the current 3GPP Release 19, as of a time of this disclosure. A value of implementing the present techniques can relate to implementing them in currently-orbiting/legacy satellites.

The present techniques can be implemented to facilitate speeding up a use of satellite communication in order to reduce holes in cellular coverage areas.

The present techniques can provide the following benefits. The present techniques can facilitate a reduction in latency for communication markets, voice, data, Internet-of-Things (IoT), narrowband (NB) IoT, and broadband. In some examples, the present techniques can offer half the latency of prior approaches. It can be that this reduction in latency does not have detrimental effects on key performance indicators (KPIs) like throughput and quality-of-service (QOS).

The present techniques can facilitate forward compatibility and backward compatibility with existing satellite constellations. The present techniques can be implemented as an overlay onto existing, deployed, legacy communication satellites. An ability to add terrestrial/mobile 5G NR to existing/deployed satellite constellations can be an improvement in telecommunications.

The present techniques can facilitate a reduction in satellite provider capital expense (capex), by reducing a number of NTN gateway notes in a satellite provider's network.

The present techniques can facilitate global coverage/ubiquitous coverage by facilitating broadband access in under-served/rural communities.

The present techniques can facilitate merging ground networks (mobile) and space mesh networks (satellite). With prior approaches, it can be that packets are not exchanged across these satellite-to-satellite Optical/RF ISL domains. The present techniques can be implemented to facilitate digital tunneling protocol, allowing traffic to cross over into a different domain.

The present techniques can be implemented to facilitate merged TN and NTN markets.

With prior approaches, it can be that the satellite industry does not follow standards organizations, and there is not an equivalent standards organization to the MNOs' 3GPP. Rather, it can be that satellite vendors build their satellites custom to their needs at the time. More recently, the satellite industry has begun to source generic satellites from satellite manufacturers, and these vendors can provide custom features.

It can be that individual satellite providers are building large constellations that can include thousands of LEO satellites, but they do not share detailed information about their satellite architecture.

There can be minimal NTN architecture guidelines in 3GPP specifications, which can outline 5G NR support for NTNs.

There can be a push in the satellite provider industry to support software defined radios (SDRs) that facilitate programmability of a radio. The present techniques can leverage programmable radios that can be deployed in some satellites that are already in orbit.

The present techniques can be used to mitigate problems with packet format incompatibility between Terrestrial Network (TN/Mobile) and Non-Terrestrial Networks (NTN/Space/Aerial) network. NTN can generally refer to a network that involves non-terrestrial flying objects. A NTN can comprise variants of space-born and aerial communication networks. A use for a NTN can be connecting under-served communities to broadband where internet access is not available through terrestrial (mobile), fiber, or cable networks.

A NTN satellite communication network can utilize spaceborne platforms, which can include:

low earth orbiting (LEO) satellites;
medium earth orbiting (MEO) satellites;
geosynchronous earth orbiting (GEO) satellites;
high altitude platform systems (HAPS);
unmanned aerial vehicle (UAV); and
air to ground (A2G) networks.

A merging of TNs (e.g., mobile) and NTNs can create opportunities for satellite providers and MNOs. A challenge in merging TN and NTN networks can lie in a compatibility of networks. Packet formats in TN networks and NTN networks can be different and incompatible.

With a TN and MNOs, network and packet format definitions can be set forth according to a 3GPP Standards Development Organization (SDO). These packet formats can include second generation (2G), third generation (3G), fourth generation (4G)/long-term evolution (LTE), and fifth generation (5G) wireless packet formats.

With a NTN and satellite providers, a satellite provider can architect, develop, and deploy NTN equipment in satellites, UAVs, drones, and HAPS vehicles. A satellite provider network and packet format can be different from typical 3GPP-generated TN/mobile packets.

The present techniques can be implemented in an already deployed/in-orbit satellite. A radio unit front-end logic can exist in present satellites and can be repurposed to support the present techniques.

It can be that prior approaches do not facilitate merging a ground network and a space mesh network with legacy satellites in orbit. These two technologies were designed and deployed by different industries—MNOs and satellite communications operators.

The present techniques can facilitate future compatibility. Where satellite providers deploy 3GPP regenerative mode, where a RU, distributed unit (DU), and centralized unit (CU) are terminated in a satellite—a packet format according to the present techniques can co-exist with a regen mode packet format.

In some examples, different—or any—packet header structures can be used with the present techniques. It can be that a satellite control plane communicates with destination satellite and ground communication equipment, and these devices can select which packet header structure is utilized for a global end-to-end communications link.

In some examples, an ingress data-plane according to the present techniques can comprise a conversion process to industry-standard internet-protocol (IP) networking protocols. This can be because, a space-mesh-network can comprise commercial off-the-shelf (COTS) internet-protocol networking protocols and technologies (e.g., IPv4, IPv6, L2TPv3, TCP, IP, UDP). Where the present techniques meet IP networking protocols, this can facilitate immediate adoption in the market.

With prior approaches, 3GPP transparent mode can function as a bent-pipe architecture where a 5G NR air interface is ingress at a service-link, repeated in the satellite, and egressed out the satellite feeder-link. Prior approaches lack a way for an ingress 5G NR data-plane to leave the satellite through an ISL (RF/optical) and enter a space-mesh-network.

In some examples, a fiber optic cable can comprise a cause of higher latency in routing through a Terrestrial Network compared to a space-mesh-network. In some examples, when a packet enters a space-mesh-network, there can be multiple paths to reach its destination. A shortest viable path through an ISL can be determined and utilized for the packet.

While the examples herein generally relate to 5G NR protocols, it can be appreciated that the present techniques can be applied to other terrestrial wireless protocols, such as 3G, 4G, LTE, and 6G protocols.

Example Architectures, Etc.

FIG. 1 illustrates an example system architecture 100 that can facilitate a satellite communications tunneling protocol for a space mesh network, in accordance with an embodiment of this disclosure.

System architecture 100 comprises user equipment (UE) 102A, UE 102B, communication circuitry 104A, communication circuitry 104B, Non-Terrestrial Network (NTN) 106, satellite communications tunneling protocol for a space mesh network component 108A, satellite communications tunneling protocol for a space mesh network component 108B, satellite communications tunneling protocol for a space mesh network component 108C, satellite 110A, satellite 110B, and/or satellite 110C.

System architecture 100 presents one logical example of implementing the present techniques, and it can be appreciated that there can be other example architectures.

Figure 11:
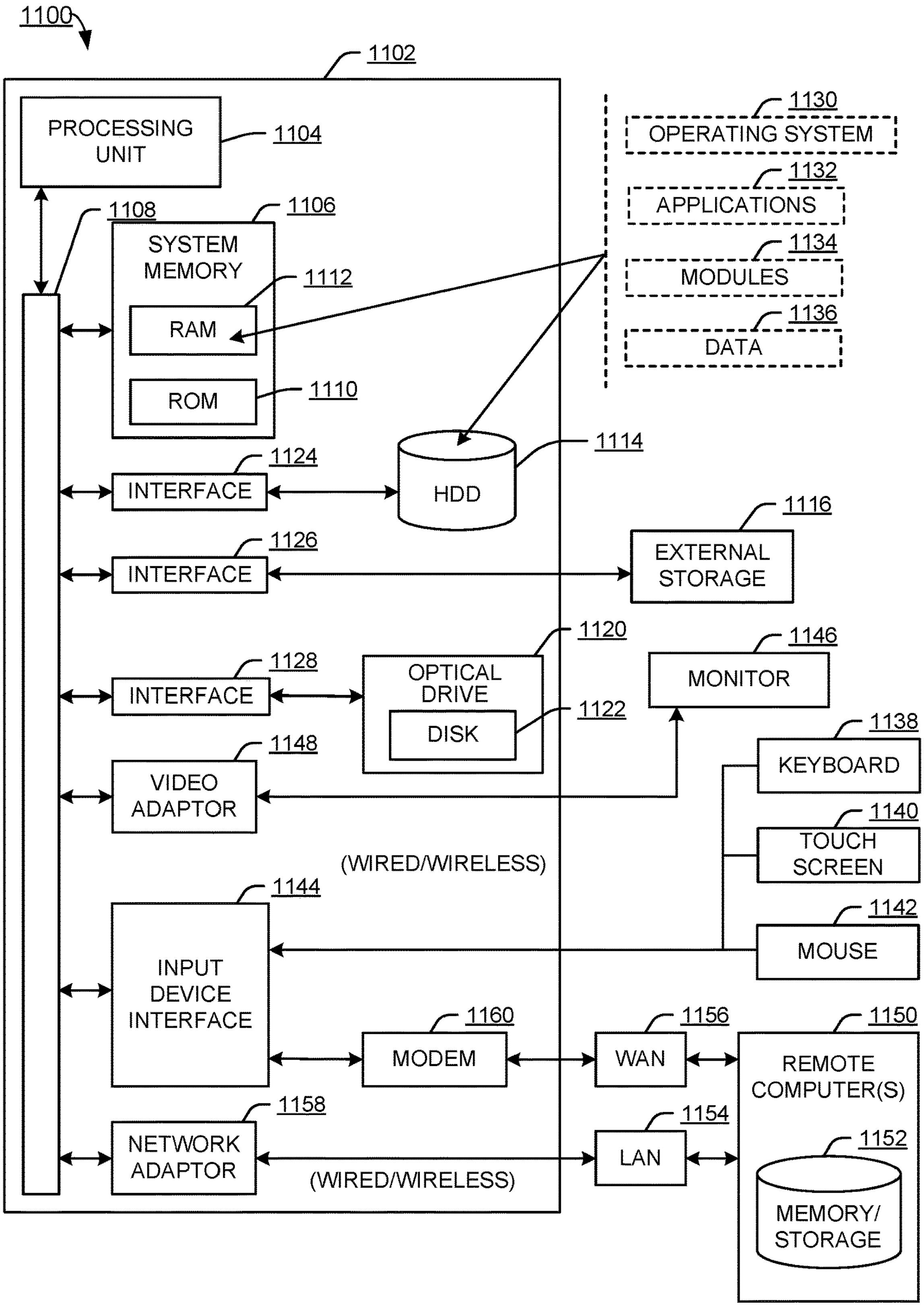
FIG. 11 illustrates an example block diagram of a computer operable to execute an embodiment of this disclosure.

Each of UE 102A, UE 102B, TN 104A, TN 104B, NTN 106, satellite 110A, satellite 110B, and satellite 110C can be implemented with part(s) of computing environment 1100 of FIG. 11.

In some examples, satellite communications tunneling protocol for a space mesh network component 108A, satellite communications tunneling protocol for a space mesh network component 108B, and/or satellite communications tunneling protocol for a space mesh network component 108C can facilitate a satellite communications tunneling protocol for a space mesh network for communications between UE 102A and UE 102B.

Figure 8:
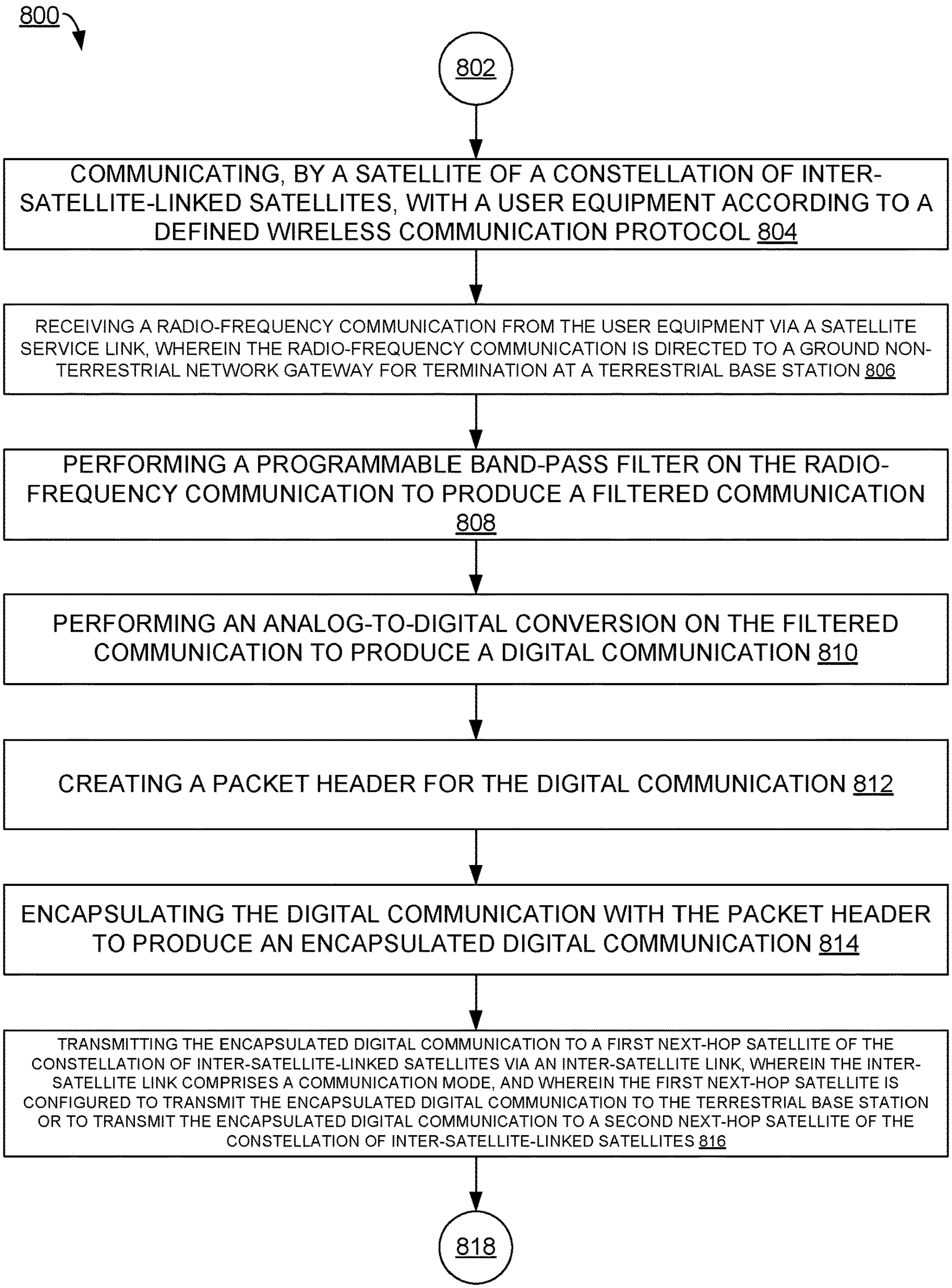
FIG. 8 illustrates an example process flow that can facilitate a satellite communications tunneling protocol for a space mesh network, in accordance with an embodiment of this disclosure.
Figure 9:
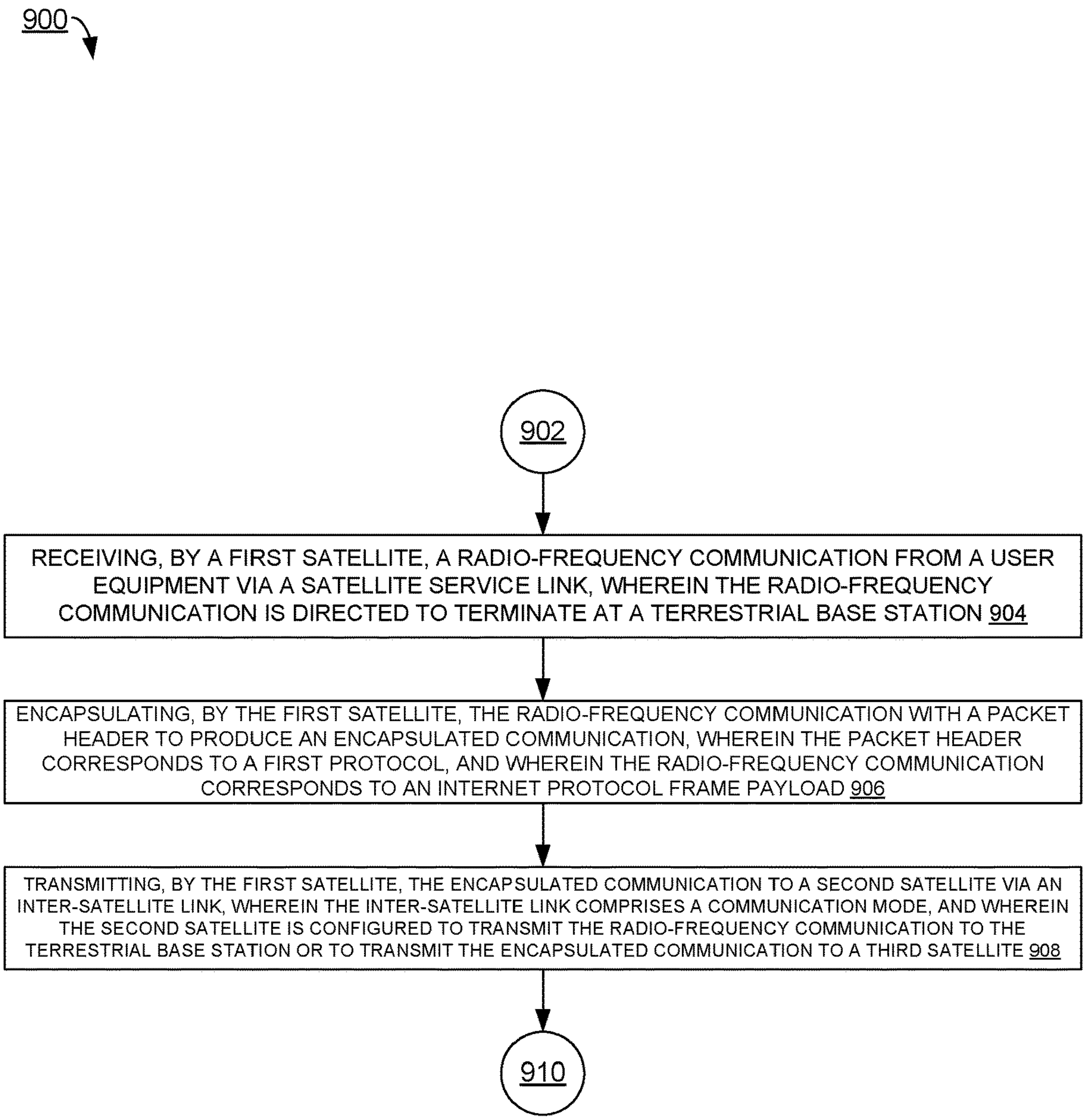
FIG. 9 illustrates another example process flow that can facilitate a satellite communications tunneling protocol for a space mesh network, in accordance with an embodiment of this disclosure.
Figure 10:
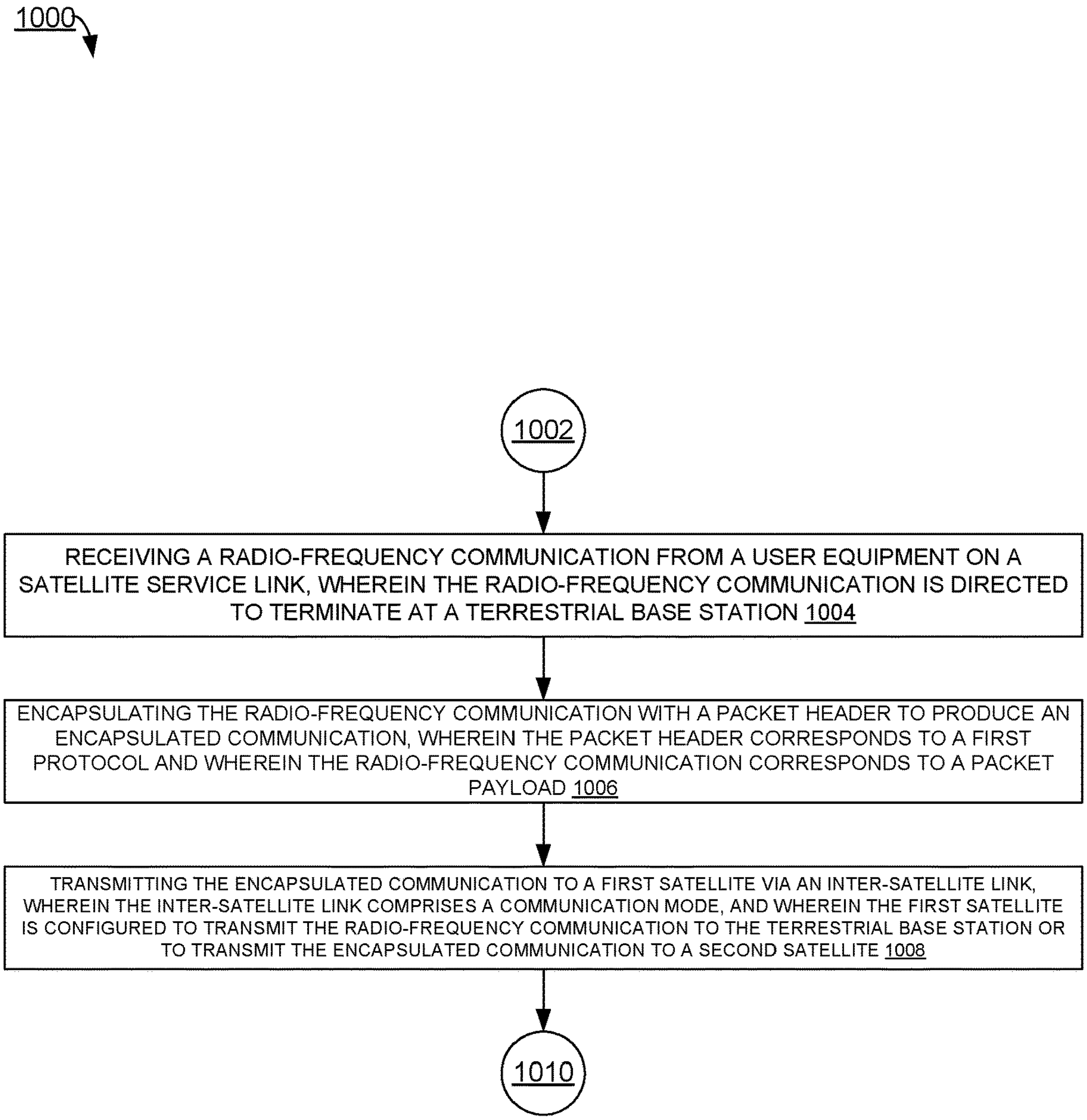
FIG. 10 illustrates another example process flow that can facilitate a satellite communications tunneling protocol for a space mesh network, in accordance with an embodiment of this disclosure.

In some examples, satellite communications tunneling protocol for a space mesh network component 108A, satellite communications tunneling protocol for a space mesh network component 108B, and/or satellite communications tunneling protocol for a space mesh network component 108C can implement part(s) of the process flows of FIGS. 8-10 to implement a satellite communications tunneling protocol for a space mesh network.

It can be appreciated that system architecture 100 is one example system architecture for satellite communications tunneling protocol for a space mesh network, and that there can be other system architectures that facilitate a satellite communications tunneling protocol for a space mesh network.

Figure 2:
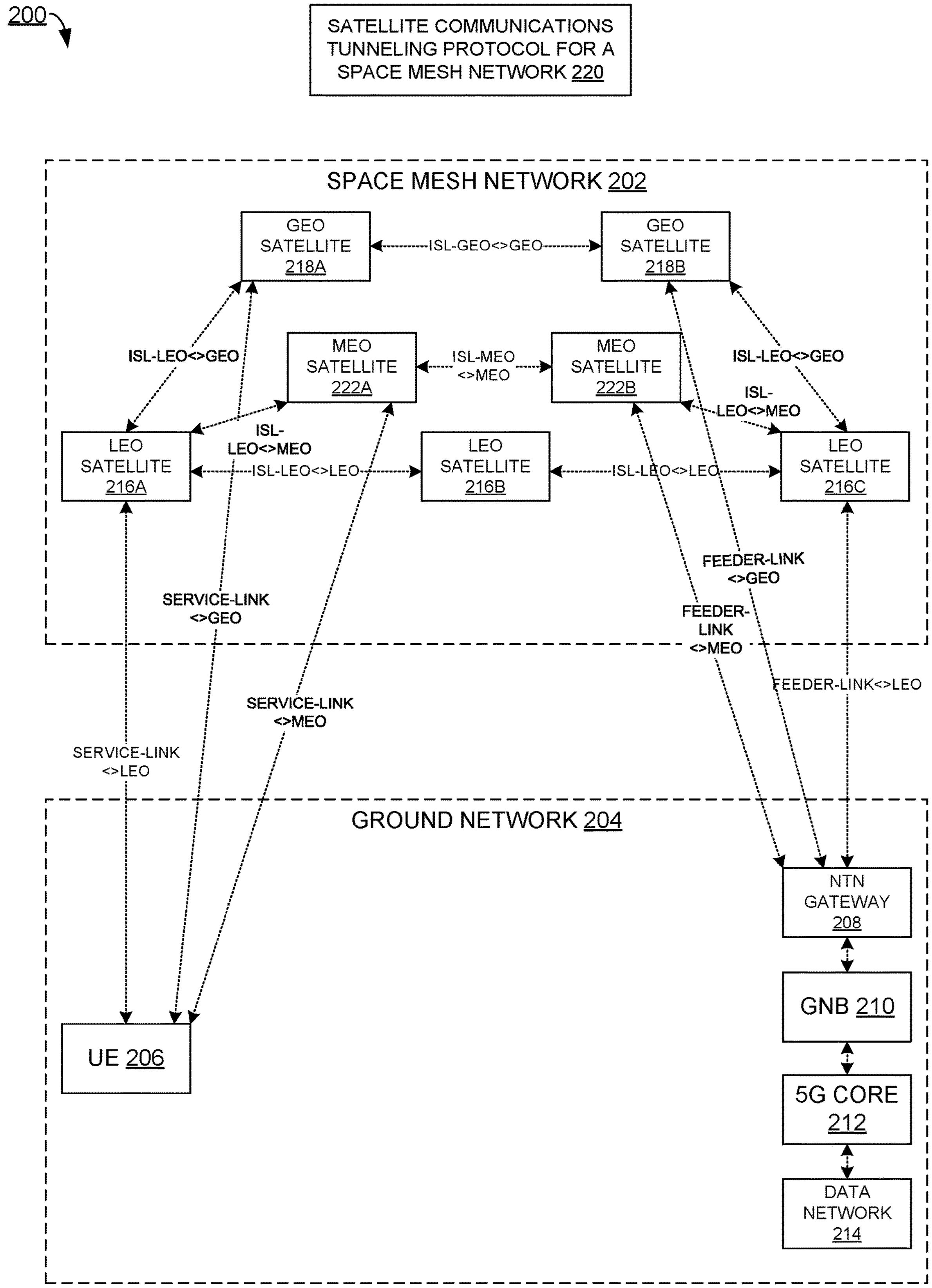
FIG. 2 illustrates a system architecture of a ground and space mesh network that comprises a ground network, a space mesh network, low Earth orbit (LEO)/Medium Earth orbit (LEO)/geosynchronous Earth orbit (GEO) satellites, high altitude platform systems (HAPS), and unmanned aerial vehicles (UAVs), and that can facilitate a satellite communications tunneling protocol for a space mesh network, in accordance with an embodiment of this disclosure.

FIG. 2 illustrates a system architecture 200 of a ground and space mesh network that comprises a ground network, a space mesh network, low Earth orbit (LEO)/medium Earth orbit (MEO)/geosynchronous Earth orbit (GEO) satellites, and that can facilitate a satellite communications tunneling protocol for a space mesh network, in accordance with an embodiment of this disclosure. In some examples, part(s) of system architecture 200 can be used to implement part(s) of system architecture 100 of FIG. 1 to facilitate a satellite communications tunneling protocol for a space mesh network.

System architecture 200 comprises space mesh network 202, ground network 204, UE 206, NTN gateway 208, gNB 210, 5G core 212, data network 214, LEO satellite 216A, LEO satellite 216B, LEO satellite 216C, GEO satellite 218A, GEO satellite 218B, satellite communications tunneling protocol for a space mesh network component 220, MEO satellite 222A, and MEO satellite 222B.

NTNs can be described as "any network that flies." A NTN architecture can support LEO/medium Earth orbit (MEO)/geosynchronous Earth orbit (GEO) satellites, high altitude platform systems (HAPS), and unmanned aerial vehicles (UAVs).

FIG. 2 illustrates a ground network and a space mesh network. A ground network can comprise an internet protocol (IP) packet network, using IP and/or ethernet packet formats, and processed with mostly Internet Protocol (IP)/Ethernet Packet formats, processed by present routers and switches.

A space mesh network can comprise a newer, un-standardized, vendor-specific network. A network packet format of a ground network and a space mesh network can be unique to each network technology, and they can be incompatible with each other.

The present techniques can be implemented to solve the incompatibility of the ground network and the space mesh network by creating a new 5G New Radio (NR) packet format that can be transferred between the ground network and the space mesh network. That is, the present techniques can be implemented to facilitate a digital tunneling protocol, which can bridge incompatible industries. An advantage can be found both locally (in country), and globally. Operation without the present techniques can force many hops between satellite and ground stations, which can mean higher cost, complexity, and longer latencies.

The present techniques can be important to a build-out of a converged ground network and the space mesh network, which can be part of a MNO merging of TNs and NTNs.

A service called "direct to device (D2D)" can be in a process of becoming a hot topic in the MNO and satellite providers converged markets. The MNOs can be partnering with the satellite providers to deliver NTN service. This D2D service can be a cellphone, Internet of Things (IoT), narrowband (NB) IoT, voice, data, and/or broadband connecting to a NTN satellite, thus supplying ubiquitous connectivity across the globe. The present techniques can be applied to D2D scenarios, as well as other satellite communication technology like very small aperture (VSAT) customer premise equipment (CPE), etc.

The present techniques can be implemented to merge a Ground network and a space mesh network, and this can be achieved through a digital tunneling protocol, which can bridge incompatible industries. In prior approaches, D2D data from user equipment (UE) can be sent from ground to satellite, and the UE communication link can be beamed back to Earth using a relay system on the satellite, which can be referred to a "bent pipe," or a "satellite transparent mode." During this bent pipe communication propagation, a RF signal can enter a LEO satellite, and the RF signal can be frequency converted, amplified, and sent back to Earth. During this bent pipe operation, it can be that the RF is not demodulated back to a baseband, digital packet format. This lack of demodulation in the present techniques is not found in prior approaches.

The present techniques can facilitate translation of the two different and unique networks. Previously-deployed LEO satellites can include silicon solutions and software defined radios that can be adapted to demodulate a RF signal down to a pseudo packet format. The present techniques can be compatible with a space mesh network. These packets can ingress/egress through Inter Satellite Links (ISL), thus connecting satellites in orbit, allowing communication across the globe. Global space communication can yield enormous benefits when it comes to latency, cost and quality-of-service (QOS).

A notebook computer that is part of the ground network is part of an under-served/rural broadband/closing of the digital divide community where no terrestrial/mobile network, cable (Data Over Cable Service Interface Specification (DOCSIS)) or fiber network is available.

The satellite-enabled Non-Terrestrial Network (NTN) can address this problem of broadband access by filling in the voids in networks service using LEO satellites.

There can be many use cases for Non-Terrestrial Networks (NTN) aside from an example of an under-served broadband community. A value of the present techniques can be a reduced latency using a data path outlined of the present techniques, which can be beneficial in other scenarios, such as high-frequency trading.

The present techniques can be implemented onboard a satellite system, as part of the satellite's communication link. Satellites can comprise radios as part of their communication link, and this radio can be a software defined radio (SDR).

Translating of a ground network RF packet to a space mesh network data packet can be performed in a satellite radio, which can be part of the satellite's communication link. Examples of an ingress data path and an egress data path are described later. There can be many LEO satellite constellations already orbiting the globe that can be upgraded to support the present techniques. This backward compatibility can be a benefit of the present techniques.

An optical/RF inter satellite link (ISL) can be utilized in the present techniques. Satellites can communicate in a space mesh network via coherent optical wavelength ISL links. In other examples, the ISL links can be RF links.

A satellite ingress data path can be implemented as follows. This can be utilized for processing a satellite uplink packet service link termination of a packet in a satellite. An ingress path can be part of a radio unit of a satellite.

Figure 3:
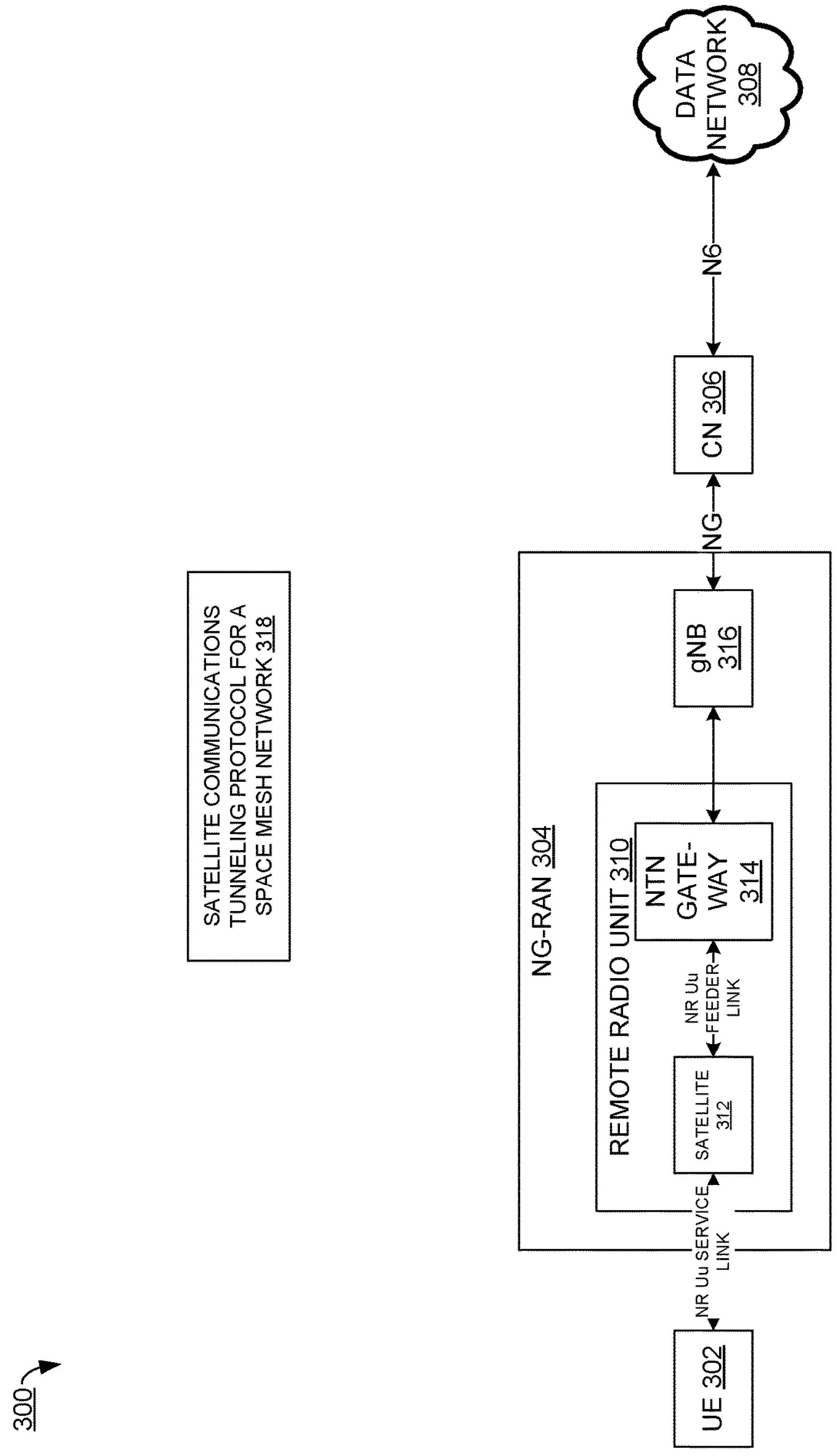
FIG. 3 illustrates an example transparent next generation radio access network (NG-RAN) system architecture, and that can facilitate a satellite communications tunneling protocol for a space mesh network, in accordance with an embodiment of this disclosure.

FIG. 3 illustrates an example transparent next generation radio access network (NG-RAN) system architecture 300, and that can facilitate a satellite communications tunneling protocol for a space mesh network, in accordance with an embodiment of this disclosure. In some examples, part(s) of system architecture 300 can be used to implement part(s) of system architecture 100 of FIG. 1 to facilitate a satellite communications tunneling protocol for a space mesh network.

System architecture 300 comprises UE 302, NG-RAN 304, core network (CN) 306, data network 308, remote radio unit 310, satellite 312, Non-Terrestrial Network (NTN) gateway 314, gNB 316, and satellite communications tunneling protocol for a space mesh network component 318.

3GPP can define standards to support interoperability between satcom operators and 4G/5G operators. NR-NTN normative specifications can describe two architectures: transparent mode and regenerative mode.

In a transparent architecture, a satellite payload can implement radio unit (RU) functions such as frequency conversion and RF amplification, acting as a radio relay. Both a service link and a feeder link can use an NR air (Uu) interface. This can allow different satcoms to connect the same gNodeB (gNB) on the ground.

It can be that, in a transparent NG-RAN architecture, a satellite acts as an RF relay, and only includes a radio unit (RU).

A NTN can be implemented as follows, and can illustrate a ground-to-satellite communication link, and can be used in NTN transparent mode and regenerative mode topologies.

It can be that prior satellites now in orbit were not designed for connecting through a true global space mesh network. It can be that these deployed/in-orbit satellites were deployed over a decade ago, before a space mesh network was conceived. The present techniques can be implemented to connect a satellite to a satellite utilizing a global space mesh network.

A 3GPP transparent mode data flow can include:

service link: UE to satellite radio frequency communication link;

feeder link: satellite to NTN gateway radio frequency communication link;

satellite payload implements uplink/downlink frequency conversion and frequency amplification, but no demodulation of the radio frequency carrier (bent pipe mode); and traditional satellite radio interface (SRI) NR Uu (that is, the satellite does not terminate the 5G NR stack).

An air interface can include:

NTN mode (transparent mode, regen mode (A/B), proprietary);

L1 physical interface;

service link/feeder link;

bands (TN, NTN, shared);

service link/feeder link frequency;

antenna technology;

UE and NTN gateway/satellite;

physical constraints;

interference, weather, scintillation, channel modeling, link budget analysis;

use case/market/protocol (e.g., IoT, NB IoT (4G/LTE), redcap, 5G NR); and packet format/tunneled packet (e.g., 3GPP general packet radio service (GPRS) tunneling protocol (GTP) tunnel, internet protocol (IP), user datagram protocol (UDP), proprietary).

A problem with this architecture can be that a latency using a transparent mode/bent pipe mode. In some examples, this latency can be as high as 150 milliseconds (ms) (one way) due to a need to terminate a 5G NR stack at a gNodeB (gNB) on the other side of a NTN network—the feeder link/NTN gateway side.

If a global network, a merged/compatible ground network and space mesh network utilize the present techniques, the global latency in this example could be reduced to <30 ms.

Figure 4:
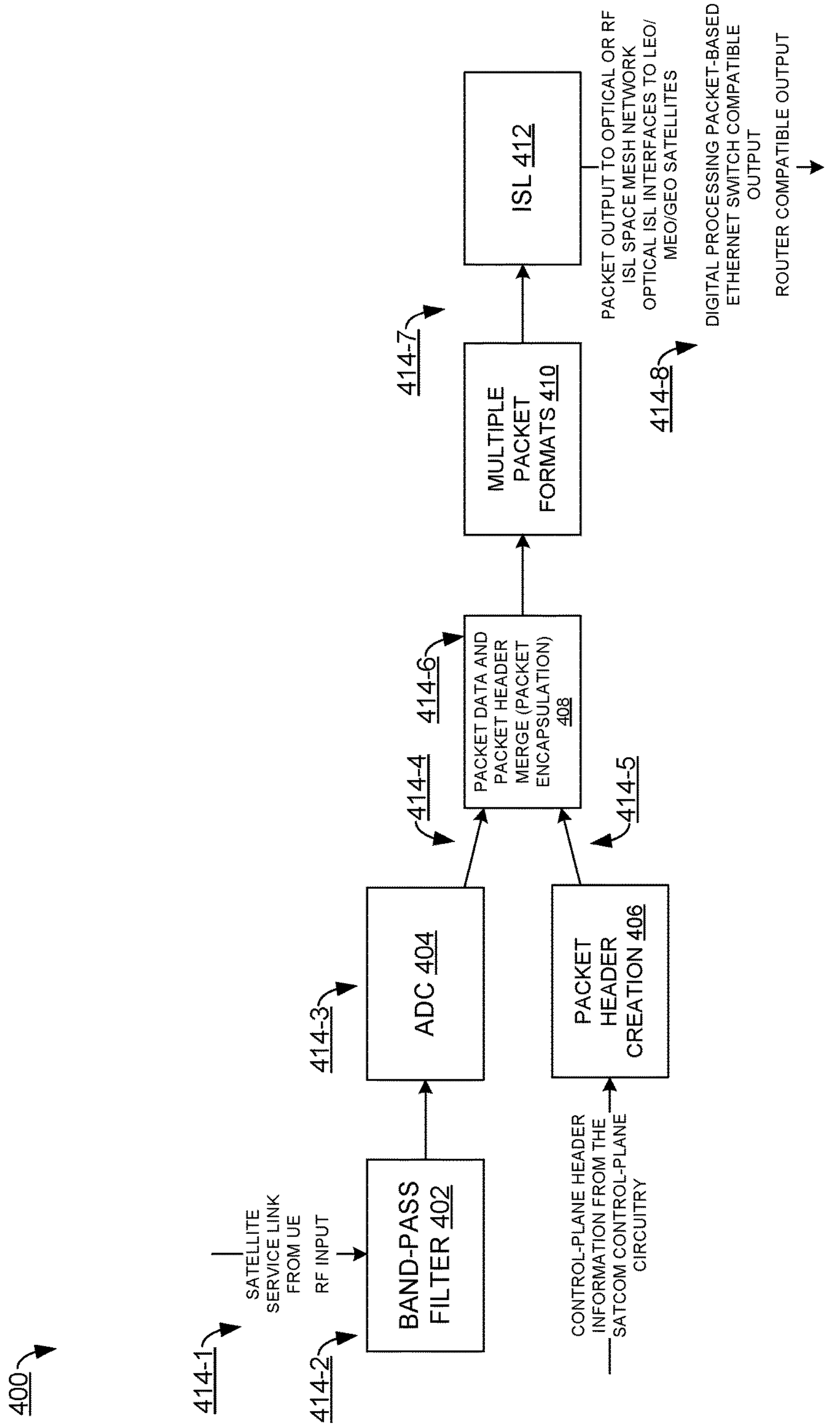
FIG. 4 illustrates an example signal flow of an ingress data path of encapsulation of a 5G NR packet inside a LEO satellite, and that can facilitate a satellite communications tunneling protocol for a space mesh network, in accordance with an embodiment of this disclosure.

FIG. 4 illustrates an example signal flow 400 of an ingress data path of encapsulation of a 5G NR packet inside a LEO satellite, and that can facilitate a satellite communications tunneling protocol for a space mesh network, in accordance with an embodiment of this disclosure. In some examples, part(s) of system architecture 400 can be used to implement part(s) of system architecture 100 of FIG. 1 to facilitate a satellite communications tunneling protocol for a space mesh network.

System architecture 400 comprises band-pass filter (5G NR FR 1, L-band, S-band, etc.) 402, analog-to-digital converter (ADC) 404, packet header creation (IPv6, IPv4, 802.3, tunneling protocol) 406, packet data and packet header merge (packet encapsulation) 408, multiple packet formats (5GNR-o-IPv6, 5GNR-o-IPv4, 5GNR-o-IPv6-o-802.3, 5GNR-0-IPv4-o-802.3, 5GNR-o-Tunnel_Protocol-o-IPvX, 5GNR-o-Tunnel_Protocol-o-IPvX-o-802.3) 410, and inter-satellite link (ISL) 412.

FIG. 4 illustrates an example system architecture 400 of an ingress data path of termination of a 5G NR packet inside a LEO satellite, and that can facilitate a satellite communications tunneling protocol for a space mesh network, in accordance with an embodiment of this disclosure. In some examples, part(s) of system architecture 400 can be used to implement part(s) of system architecture 100 of FIG. 1 to facilitate a satellite communications tunneling protocol for a space mesh network.

A satellite ingress data path can be implemented as follows. This can be utilized for processing a satellite uplink packet service link termination of a packet in a satellite. An ingress path can be part of a radio unit of a satellite.

In some examples, electronics depicted can be present in legacy/already-deployed satellites, while the data transfer is made according to the present techniques. This can offer a benefit of facilitating the present techniques with legacy satellites that were deployed into space into the past. So, the present techniques can be implemented without the satellite industry deploying new satellites—that is, the industry can overlap the present techniques on their existing, deployed satellite assets.

It can be that many of the LEO satellites deployed today include programmable RF silicon and software defined radio units (RUs). Some satellite manufacturers can use field programmable gate arrays (FPGA) technology in order to reconfigure their satellite silicon solutions.

The preset techniques can facilitate a bidirectional data path. Where an example illustrates a unidirectional communication, it can be appreciated that there can be a corresponding communication in the other direction to facilitate a bidirectional data path. The bidirectional data path can generally comprise ground gNB>>NTN Gateway>>uplink feeder-link>>ingress satellite>>ingress ISL (RF/Optical) >>space-mesh-network>>egress ISL>>egress satellite>>downlink service-link>>UE downlink. This is a node-for-node life-of-a-packet reverse communication datapath. In some examples, every LEO/MEO/GEO satellite includes ingress-ISL and egress-ISL data-path circuitry. These components can allow any satellite to support bidirectional data-path operation and communication.

A life of a packet on an ingress data path inside a satellite RU-RF input to optical ISL can be as follows.

1. An RF input into RF input into a RU can be a 5G NR air interface. This can be an uplink ground-to-satellite “service link” RF data path.
2. At 414-2, a 1st stage band pass filter can process an incoming RF signal, passing a 5G NR RF frequency band utilized by a satellite provider/MNO. It can also pass NTN approved L Band (1,600 megahertz (MHz)) and S Band (2,100 MHz), and miscellaneous approved bands. It can reject other bands and frequencies.
3. At 414-3, a next data path stage can be an analog to digital converter (A/D). A filtered carrier band signal can be converted from an analog domain to a digital domain using sampling A/D technology.
4. At 414-4 an output of the A/D can be 5G NR samples, and digitized 5G NR samples can be inserted into a packet structure, such as a L4 payload area of an Internet Protocol (IP) packet structure.
5. At 414-5, a packet header creation block can communicate with a control plane of the satellite and received packet header information. It can create a packet header structure required by the network.
6. At 414-6, the packet header and the 5GNR samples can be merged together in a merge block, the packet header packet payload block. In the example, the combined packet is called a 5GNR-o-IPv4-o-802.3 complete packet. This packet can also be of a different type, such as 5GNR over (o) Internet Protocol version 4 (IPv4)-o-Institute of Electronics and Electrical Engineers 802.3 protocol, 5GNR-o-IPv6-o-802.3, 5GNR-o-UDP-o-IPv4-o-802.3, 5GNR-o-UDP-o-IP version 6 (IPv6)-o-802.3, 5GNR-o-Layer 2 Tunneling Protocol Version 3 (L2TPv3)-o-IPv6-o-802.3, and 5GNR-o-L2TPv3-o-UDP-o-IPv6-o-802.3. These are examples, and it can be appreciated that the present techniques can be implemented with other packet formats.
7. At 414-7 and 414-8, this combined/complete packet (packet header packet payload) can now be processed through a satellite Inter Satellite link (ISL). The ISL can be an optical or an RF transmitter/receiver. The ISL can process Internet Protocol (IP) encoded packets. As the ISL from one satellite talks to the ISL links from another satellite, they can create a global and bidirectional space mesh network, the space mesh network can span the entire Earth.

Figure 5:
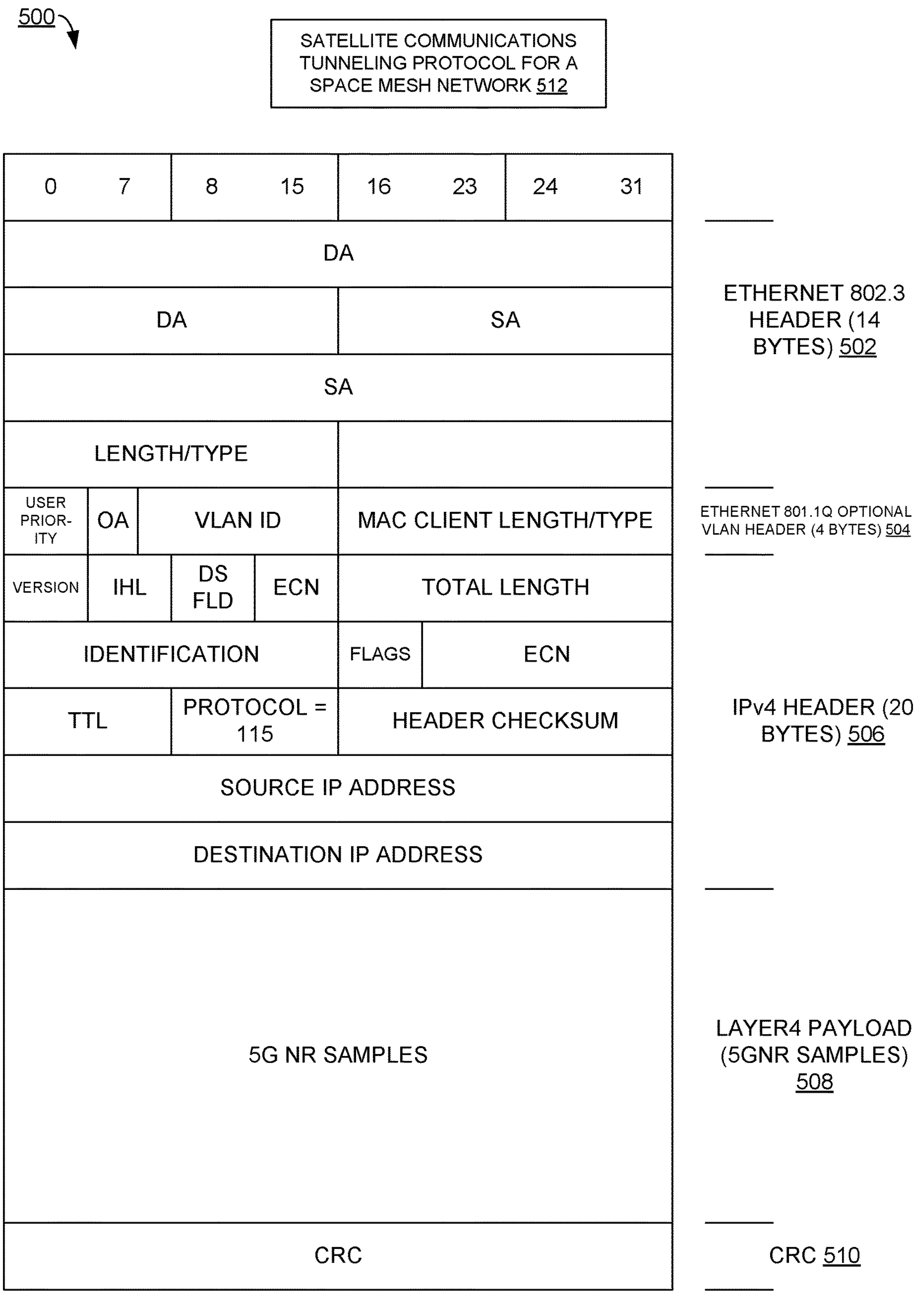
FIG. 5 illustrates an example packet structure, and that can facilitate a satellite communications tunneling protocol for a space mesh network, in accordance with an embodiment of this disclosure.

FIG. 5 illustrates an example packet structure 500, and that can facilitate a satellite communications tunneling protocol for a space mesh network, in accordance with an embodiment of this disclosure. In some examples, part(s) of packet structure 500 can be used to implement part(s) of system architecture 100 of FIG. 1 to facilitate a satellite communications tunneling protocol for a space mesh network. This is an example, and it can be appreciated that the present techniques can be implemented with other packet formats.

Packet structure 500 comprises ethernet 802.3 header (14 bytes) 502, ethernet 801.1Q optional virtual local area network (VLAN) header (4 bytes) 504, IPv4 header (20 bytes) 506, Layer4 payload (5GNR samples) 508, cyclic redundancy check (CRC) 510, and satellite communications tunneling protocol for a space mesh network component 512

Figure 6:
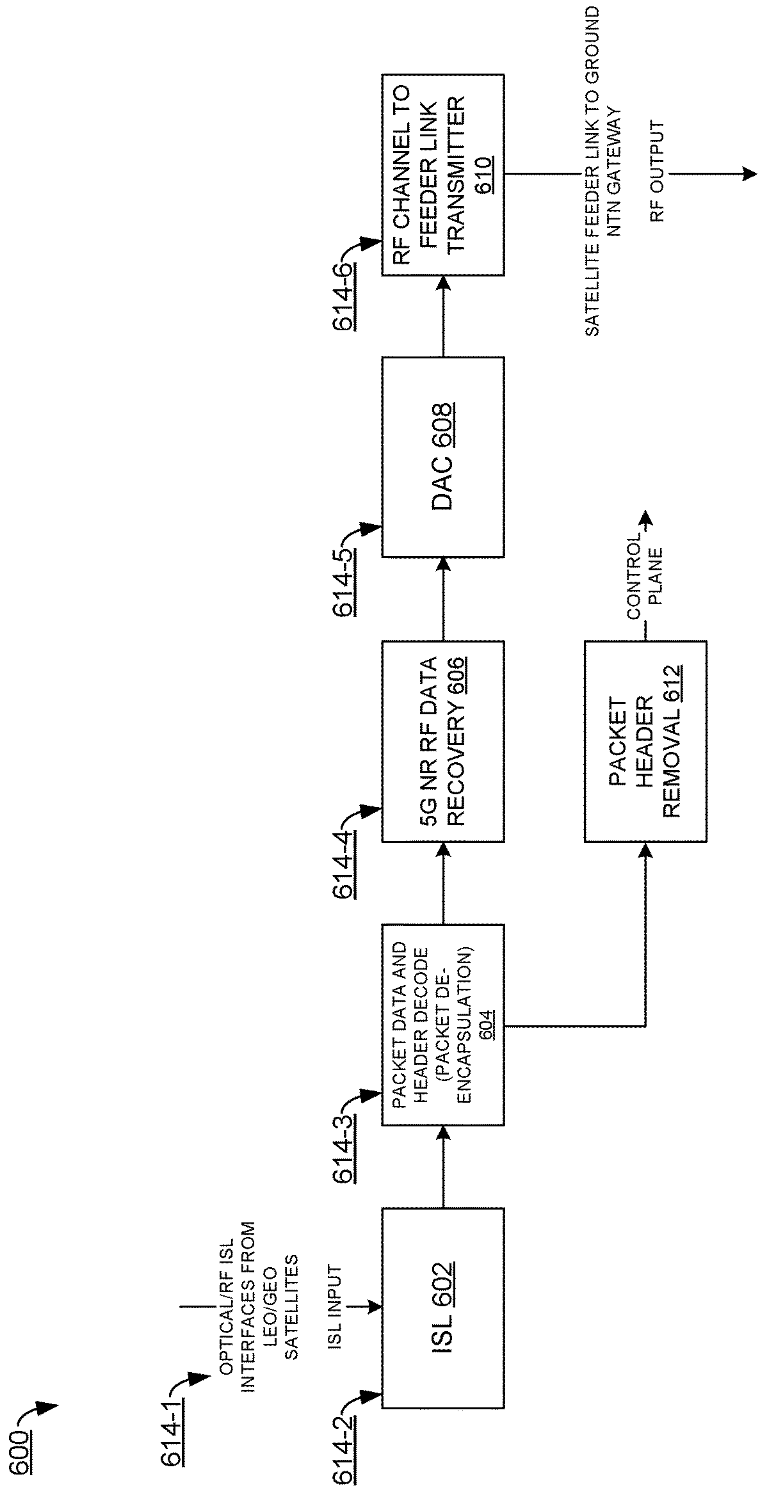
FIG. 6 illustrates an example signal flow of an egress data path of receiving a packet from a space mesh network and transmitting the RF-encoded packet on a satellite feeder link, and that can facilitate a satellite communications tunneling protocol for a space mesh network, in accordance with an embodiment of this disclosure.

FIG. 6 illustrates an example system architecture 600 of an egress data path of receiving a packet from a space mesh network and transmitting the RF-encoded packet on a satellite feeder link, and that can facilitate a satellite communications tunneling protocol for a space mesh network, in accordance with an embodiment of this disclosure. In some examples, part(s) of system architecture 600 can be used to implement part(s) of system architecture 100 of FIG. 1 to facilitate a satellite communications tunneling protocol for a space mesh network.

System architecture 600 comprises Optical/RF ISL 602, packet data and packet header decode (packet de-encapsulation) 604, 5G NR RF data recovery 606, digital-to-analog converter (DAC) 608, RF channel to feeder link transmitter 610, packet header removal (IPv6, IPv4, 802.3, tunneling protocol) 612, 614-1, 614-2, 614-3, 614-4, 614-5, and 614-6.

The preset techniques can facilitate a bidirectional data path. Where an example illustrates a unidirectional communication, it can be appreciated that there can be a corresponding communication in the other direction to facilitate a bidirectional data path.

In FIG. 6, this shows the egress-ISL to egress-satellite-feeder-link. The end-to-end communication link can include all nodes in the following “UE uplink>>uplink-service-link>>ingress satellite>>ingress ISL (RF/Optical)>>space-mesh-network>>egress ISL>>egress satellite>>downlink feeder-link>>NTN Gateway>>ground gNB." And, for continued clarification, the end-to-end reverse communication link can include "ground gNB>>NTN Gateway>>uplink feeder-link>>ingress satellite>>ingress ISL (RF/Optical) >>space-mesh-network>>egress ISL>>egress satellite>>downlink service-link>>UE downlink."

A satellite egress data path, for processing a satellite downlink packet-feeder link>>NTN gateway, can be implemented as follows.

An egress data path for packets received from a space mesh network can comprise processing packets, converting the packets back to a 5G NR RF waveform, digital-to-analog (D/A) converting the waveform, and transmitting the converted waveform on a satellite feeder link.

An egress data path can travel from an optical/RF inter satellite link (ISL) input into a radio unit from a space mesh network. In some examples, packets traversing a space mesh network can be from anywhere across the globe, and a LEO/MEO/geosynchronous Earth orbit (GEO) satellite constellation can comprise a global constellation. An output interface can be a RF downlink interface through a satellite feeder link. The feeder link can connect the satellite to a ground NTN gateway.

1. At 614-1, data leaves a space mesh network and entering the satellite optical/RF receiver. This data can enter a satellite through the satellite's optical/RF inter satellite link (ISL).
2. At 614-2, digital packet data can enter the satellite silicon from the space mesh network through optical/RF to electrical "receiver" inter satellite links (ISLs). The output data format from the optical ISL can comprise digital Internet Protocol (IP) packet data. An IP packet format is shown in FIG. 5.
3. At 614-3, a digital packet de-encapsulation block can disassemble an IP packet, and remove headers from a payload. The original 5G New Radio (NR) samples can be extracted from the IP packet payload and processed from block 606 to 608.
4. At 614-4, recovering the 5G NR samples can comprise removing them from the assembled IP packet. The samples can be processed here, in some examples filtered, and massaged back to their original sample state.
5. At 614-5, the 5G NR samples can be pushed through a D/A conversion block, with digital samples on an input side, and analog data on an output side.
6. At 614-6, RF blocks can export the recovered 5G NR analog signal from the RU to the ground using the satellite to ground feeder link. There can be frequency conversion logic in this block, and in some examples, the feeder link can use a multitude of different bands for transmitting data to the ground.

The following table can illustrate information used in the examples herein:

| Variable | Formula | Value |
|---|---|---|
| Speed of Light (vacuum) = c | constant | 299,792,458 meters-per-second (m/s) |
| Speed of Light (air) | Speed of Light [(vacuum) − (0.3%)] | 299,792,458 − (0.3%) = 299,702,547 m/s |
| Speed of Light (Fiber optic) | See below | 199,861,639 m/s [w/c = 1.5] |
| Velocity (vacuum (space)) | v = c/n v = velocity, c = constant, speed of light(vacuum), n = Refractive Index (vacuum = 1.0) | 299,792,458 m/s/1.0 = 299,792,458 m/s |

-continued

| Variable | Formula | Value |
|---|---|---|
| Velocity (air) | v = c/n v = velocity, c = constant, speed of light(vacuum), n = Refractive Index (air = 1.0003) | 299,792,458 m/s/1.0003 = 299,702,547 m/s |
| Velocity (fiber optic) | v = c/n v = velocity, c = constant, speed of light(vacuum), n = Refractive Index (fiber = 1.5) | 299,792,458 m/s/1.5 = 199,861,639 m/s |
| Latency (vacuum) | Latency = Distance/Velocity | Distance (m)/299,792,458 m/s = |
| Latency (air) | Latency = Distance/Velocity | Distance (m)/299,702,547 m/s = |
| Latency (fiber optic) | Latency = Distance/Velocity | Distance (m)/199,861,639 m/s = |

Figure 7:
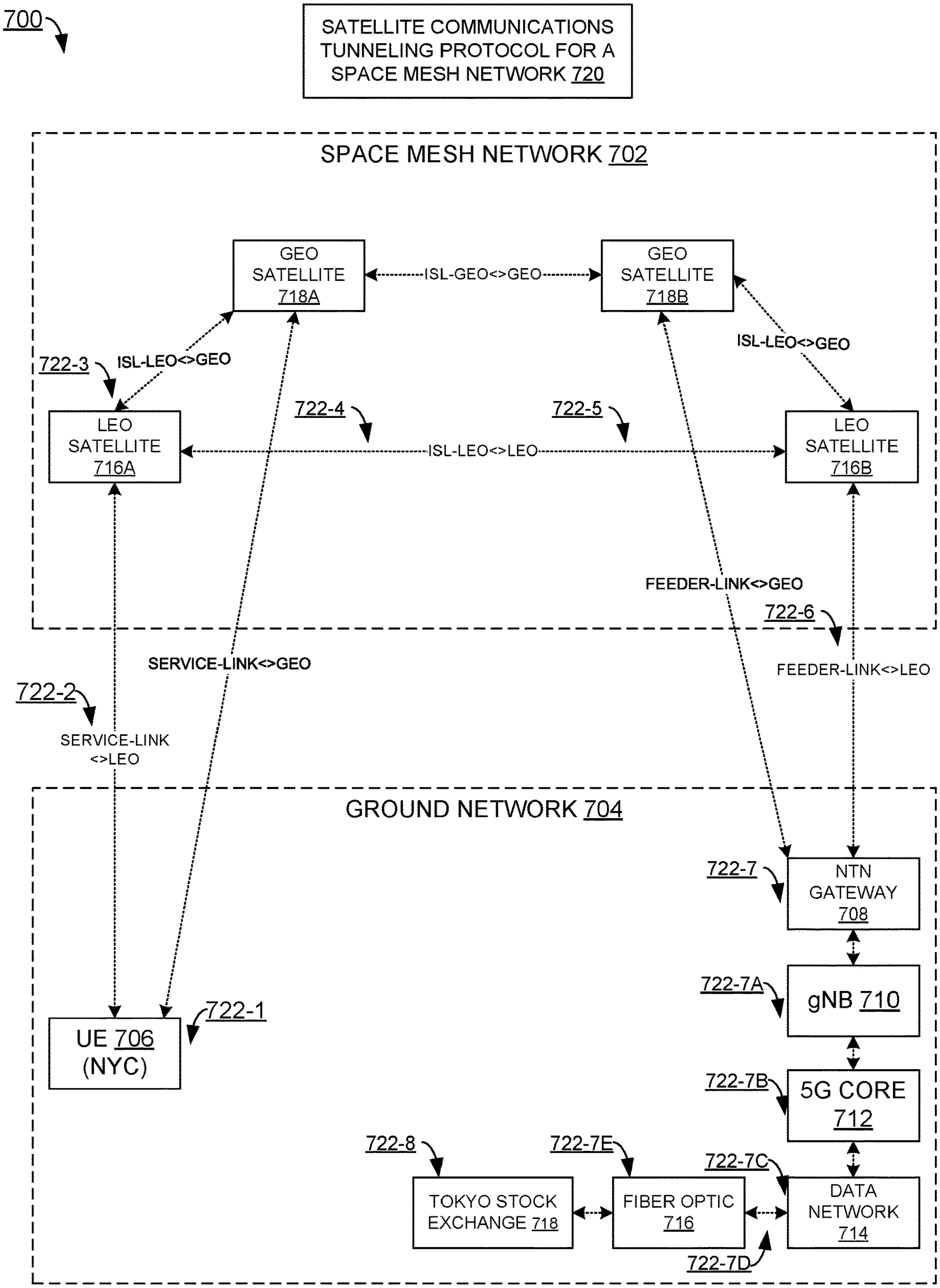
FIG. 7 illustrates an example of transmitting a packet via a space mesh network, and that can facilitate a satellite communications tunneling protocol for a space mesh network, in accordance with an embodiment of this disclosure.

According to the present techniques in the disclosure satellite communications tunneling protocol for a space mesh network, FIG. 7 illustrates a one-direction example 700 of transmitting a packet via a space mesh network, and that can facilitate a satellite communications tunneling protocol for a space mesh network, in accordance with an embodiment of this disclosure. In some examples, part(s) of example 700 can be used to implement part(s) of system architecture 100 of FIG. 1 to facilitate a satellite communications tunneling protocol for a space mesh network.

System architecture 700 comprises space mesh network 702, ground network 704, UE 706 (NYC) (indicating that the UE is physically located in New York City), NTN gateway 708, gNB 710, 5G core 712, data network 714, LEO satellite 716A, LEO satellite 716B, GEO satellite 718A, GEO satellite 718B, and satellite communications tunneling protocol for a space mesh network component 720.

In FIG. 7 the present techniques can be implemented to facilitate a lower latency for the same data transfer. Using the example above, and according to the present techniques the computer in New York City can communicate with the TSE via a space mesh network.

According to the present techniques, a one-direction delay for this data transfer of ~9,000 mi can be as low as 30 ms, which can be significantly faster than using fiber optic submarine cables at 67 ms (one direction).

The present example can be simplified in showing one direction of a round trip travel for data, where the return direction can be implemented in a similar manner.

1. At 722-1, packets leave the computer in New York City.
2. At 722-2, packets travel through a 5G interface to a LEO satellite using a service link.
3. At 722-3, once inside the satellite, the radio signal can be processed, and the packet can be translated from a ground network packet format to a space mesh network packet format. A LEO satellite can be close enough to the computer to receive data, and also close enough to transmit data to another LEO satellite using ISLs.
4. At 722-4, once the packet is translated to the space mesh network packet format, it can be passed through the space mesh network using optical ISLs.
5. At 722-5, the space mesh network can comprise a router/switch in space, and can pass packets through the space network, which can comprise multiple space network hops, and both LEO and GEO satellite hops. The satellite physical interface can be the ISL, and can be similar to an optical interface used in ground networks. A LEO satellite can be close enough to Tokyo to communicate with UE on the ground in Tokyo.

6. At 722-6, once the packet gets close to a Tokyo Stock Exchange (TSE) ground location, the packet can be beamed down to earth through a RF satellite feeder link. The intelligence from a satcom control-plane can decide a shortest/fastest route to a destination. In this example, the control-plane can select the LEO satellite closest to the NTN Gateway/Tokyo Stock Exchange.
7. At 722-7, then the packet can pass through a NTN Gateway:
   a. At 722-7*a*, a gNB (5G Radio Access Network (RAN));
   b. At 722-7*b*, then, a 5G Core (5GC);
   c. At 722-7*c*, then, a data network (DN), where a data network block can comprise a translater block from a mobile network to a ground data network;
   d. At 722-7*d*, a 5GNR-o-IPv4-o-802.3 tunneled packet can be demodulated back to an original baseband packet format and processed into a data network as a typical IP packet, and then processed through routers and switches;
   e. At 722-7*e*, once the packet routes through a fiber DN, it can enter the Tokyo Stock Exchange (TSE) information database and cause data to be retrieved.
8. At 722-8, once the data is retrieved at the Tokyo Stock Exchange (TSE), the read return packet can be sent through the same ground network-to-space mesh network, returning the read return packet to the computer, in ~33 ms, which can be almost 2-times faster than network packet delay in prior approaches using fiber optic submarine cable technology.

Latency under the present techniques can be as follows. A distance between two LEO satellites in this example can be determined as ⅔ of the ground/ocean distance of (13,317,322 m (8,275 miles), based on an angle of LEO satellites to ground UE), so 8,878,214 m (5,517 miles).

Then, using FIG. 7, from UE 706 to LEO Satellite 716A (service link, ground RF to a LEO), this can be the computer to the LEO, and latency can equal "distance (m)/velocity (air)"=400,000 m/299,702,547 m/s=1.334657 ms. From LEO 716A to LEO 716B (LEO to LEO), latency can equal "distance (m)/velocity (vacuum)"=8,878,214 m/299,792,458 m/s=29.614 ms. From LEO 716B to NTN Gateway 708 (LEO to ground RF), where the ground RF is a NTN feeder link, latency can equal "distance (m)/velocity (air)"=400,000 m/299,702,547 m/s=1.334657 ms. From NTN Gateway 708 to Toyko Stock Exchange (TSE) 718, latency can equal "distance (m)/velocity (air)"=1000 m/299,702,547 m/s=3.36 μs (which can be rounded to 1 ms).

Using these numbers, a total one-way latency using the present techniques in this example can be 1.334657 ms+29.614 ms+1.334657 ms+1 ms=33.2833 ms. This ~33 ms latency can be approximately half that of the ~67 ms latency according to prior legacy techniques.

In this example, the present techniques can be implemented to reduce latency by over 50%. In this example, the present techniques can be implemented to achieve a latency of 33.2833 ms, compared to a much-higher latency with prior techniques of 67.6327 ms. For the HFT industry, this greatly improved communication data path and latency reduction can be a significant improvement.

It can be that prior approaches cannot achieve this latency reduction. A packet can travel much faster through a space mesh network than it can travel through standard ground fiber optic cables and submarine fiber optic cables.

The present techniques can facilitate packet translation of a ground network to a space mesh network, which can facilitate allowing direct to device user equipment to a space mesh network. With this approach, packets can be sent back down from a satellite to a ground station where a mobile/telco can process the data. According to the present techniques, packets on a satellite can traverse a space mesh network, thus routing around the globe more quickly and efficiently compared to prior approaches.

Example Process Flows

FIG. 8 illustrates an example process flow 800 that can facilitate a satellite communications tunneling protocol for a space mesh network, in accordance with an embodiment of this disclosure. In some examples, one or more embodiments of process flow 800 can be implemented by satellite communications tunneling protocol for a space mesh network component 108A, satellite communications tunneling protocol for a space mesh network component 108B, and/or satellite communications tunneling protocol for a space mesh network component 108C of FIG. 1, or computing environment 1100 of FIG. 11.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 900 of FIG. 9, and/or process flow 1000 of FIG. 10.

Process flow 800 begins with 802, and moves to operation 804.

Operation 804 depicts communicating, by a satellite of a constellation of inter-satellite-linked satellites, with a user equipment according to a defined wireless communication protocol. That is, a satellite can communicate with a UE via a 3GPP protocol.

In some examples, a satellite can comprise at least one processor, and at least one memory that stores executable instructions that, when executed by the at least one processor, facilitate performance of certain operations, such as those of process flow 800. In some examples, process flow 800 can be implemented with a dedicated silicon solution, such as application-specific integrated circuits (ASICs), field-programmable gate arrays (FPGAs), CPUs, GPUs. In some examples, commercial of-the-shelf (COTS) silicon, interfaces, and/or networking protocols can be used to implement part(s) of process flow 800.

After operation 804, process flow 800 moves to operation 806.

Operation 806 depicts receiving a radio-frequency communication from the user equipment via a satellite service link, wherein the radio-frequency communication is directed to a ground non-terrestrial network gateway for termination at a terrestrial base station. That is, the satellite can receive a RF signal.

After operation 806, process flow 800 moves to operation 808.

Operation 808 depicts performing a programmable band-pass filter on the radio-frequency communication to produce a filtered communication. That is, the satellite can band-pass filter the signal received in operation 804.

In some examples, the defined wireless communication protocol is a third generation partnership project protocol, and performing the programmable band-pass filter comprises passing a radio-frequency band that corresponds to the third generation partnership project protocol in the filtered communication. In some examples, the radio-frequency band is a first radio-frequency band, and wherein the programmable band-pass filter comprises passing a mobile network operator frequency range 1 frequency band or a mobile network operator frequency range 2 frequency band in the filtered communication. That is, a satellite service-link side can utilize a 3GPP 5G NR air interface, and 3GPP FR1/FR2 MNO bands. In some examples, the band-pass filter can also pass NTN-approved L-Band (1600 MHZ) and S-Band (2100 MHZ), and miscellaneous approved bands. In some examples, it can reject all other bands and frequencies.

After operation 808, process flow 800 moves to operation 810.

Operation 810 depicts performing an analog-to-digital conversion on the filtered communication to produce a digital communication. That is, the satellite can perform ADC conversion on the signal from operation 806.

In some examples, performing the analog-to-digital conversion on the filtered communication comprises sampling the filtered communication to produce digital samples, wherein the digital communication comprises the digital samples.

After operation 810, process flow 800 moves to operation 812.

Operation 812 depicts creating a packet header for the digital communication.

That is, a packet header can be created for the signal of operation 810.

After operation 812, process flow 800 moves to operation 814.

Operation 814 depicts encapsulating the digital communication with the packet header to produce an encapsulated digital communication. That is, the signal of operation 810 can be encapsulated with the packet header of operation 812.

In some examples, the encapsulated digital communication adheres to an internet protocol format, and a payload of the encapsulated digital communication comprises adherence to a fifth generation new radio terrestrial wireless format. In some examples, encapsulating the digital communication comprises inserting the digital communication into a transmission protocol payload portion of an internet protocol packet structure.

That is, an output of ADC can be 5G NR samples, and digitized 5G NR samples can be inserted into a packet structure, such as a L4 payload area of an IP packet structure.

The packet header can identify destination information for the encapsulated digital communication.

After operation 814, process flow 800 moves to operation 816.

Operation 816 depicts transmitting the encapsulated digital communication to a first next-hop satellite of the constellation of inter-satellite-linked satellites via an inter-satellite link, wherein the inter-satellite link comprises a communication mode, and wherein the first next-hop satellite is configured to transmit the encapsulated digital communication to the terrestrial base station or to transmit the encapsulated digital communication to a second next-hop satellite of the constellation of inter-satellite-linked satellites. That is, the encapsulated packet can be forwarded to one or more satellite hops before being sent to the ground and terminated.

In this manner, data can be sent across many satellites before being sent back down to a NTN gateway, and terminating at a base station. In entering the first next-hop satellite of the constellation of inter-satellite-linked satellites via an inter-satellite link, the communication can enter a space mesh network.

An encapsulation of 5G NR packets can facilitate propagating them through an ISL and into a space-mesh-network, and then using the space-mesh-network and other satellites/inter-satellite-links (ISL), native 5G NR packets can travel the globe.

By encapsulating a radio-frequency communication with a packet header, a legacy up-and-down bent pipe can be extended to multiple hops, to form an extended tunnel for a shortest viable flow path to reduce latency.

In some examples, as part of operation 816, a last-hop satellite of the constellation of inter-satellite-linked satellites is configured to perform operations comprising receiving the encapsulated digital communication via the inter-satellite link; de-encapsulating the encapsulated digital communication to produce a received digital communication; recovering data from the received digital communication to produce a recovered digital communication; converting the recovered digital communication to an analog domain to produce a recovered radio-frequency communication; and transmitting the recovered radio-frequency communication to the terrestrial base station. This can comprise an egress data path from a satellite and to a NTN gateway as described herein.

Some examples of an egress data path can comprise converting the encapsulated digital communication from an optical or radio-frequency format to a digital format before performing the de-encapsulating. That is, an ISL can have an optical interface and/or a RF interface, and a received signal can be converted to a digital domain before de-encapsulating it.

After operation 816, process flow 800 moves to 818, where process flow 800 ends.

FIG. 9 illustrates an example process flow 900 that can facilitate a satellite communications tunneling protocol for a space mesh network, in accordance with an embodiment of this disclosure. In some examples, one or more embodiments of process flow 900 can be implemented by satellite communications tunneling protocol for a space mesh network component 108A, satellite communications tunneling protocol for a space mesh network component 108B, and/or satellite communications tunneling protocol for a space mesh network component 108C of FIG. 1, or computing environment 1100 of FIG. 11.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 800 of FIG. 8, and/or process flow 1000 of FIG. 10.

Process flow 900 begins with 902, and moves to operation 904.

Operation 904 depicts receiving, by a first satellite, a radio-frequency communication from a user equipment via a satellite service link, wherein the radio-frequency communication is directed to terminate at a terrestrial base station. In some examples, operation 904 can be implemented in a similar manner as operation 804 of FIG. 8. After operation 904, process flow 900 moves to operation 906.

Operation 906 depicts encapsulating, by the first satellite, the radio-frequency communication with a packet header to produce an encapsulated communication, wherein the packet header corresponds to a first protocol, and wherein the radio-frequency communication corresponds to an internet protocol frame payload. In some examples, operation 906 can be implemented in a similar manner as operations 810-814 of FIG. 8.

In some examples, the encapsulated communication comprises a fifth generation radio over internet protocol over 802.3 protocol communication. In some examples, the encapsulated communication comprises a fifth generation radio over user datagram protocol over 802.3 protocol communication. In some examples, the encapsulated communication comprises a fifth generation radio over layer two tunneling protocol over 802.3 protocol communication. This fifth generation radio can be 5G NR.

After operation 906, process flow 900 moves to operation 908.

Operation 908 depicts transmitting, by the first satellite, the encapsulated communication to a second satellite via an inter-satellite link, wherein the inter-satellite link comprises a communication mode, and wherein the second satellite is configured to transmit the radio-frequency communication to the terrestrial base station or to transmit the encapsulated communication to a third satellite. In some examples, operation 908 can be implemented in a similar manner as operation 816 of FIG. 8.

A result of implementing process flow 900 can be to use multi-hop satellite communications to transmit data from a UE a significant distance across the globe, and quickly.

In some examples, transmitting the encapsulated communication to the second satellite via the inter-satellite link comprises transmitting the encapsulated communication in a radio-frequency over internet protocol tunneled format. In some examples, transmitting the encapsulated communication to the second satellite via the inter-satellite link comprises transmitting the encapsulated communication in an optical format or a radio-frequency format.

After operation 908, process flow 900 moves to 910, where process flow 900 ends.

FIG. 10 illustrates an example process flow 1000 that can facilitate a satellite communications tunneling protocol for a space mesh network, in accordance with an embodiment of this disclosure. In some examples, one or more embodiments of process flow 1000 can be implemented by satellite communications tunneling protocol for a space mesh network component 108A, satellite communications tunneling protocol for a space mesh network component 108B, and/or satellite communications tunneling protocol for a space mesh network component 108C of FIG. 1, or computing environment 1100 of FIG. 11.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 800 of FIG. 8, and/or process flow 1000 of FIG. 10.

Process flow 1000 begins with 1002, and moves to operation 1004.

Operation 1004 depicts receiving a radio-frequency communication from a user equipment on a satellite service link, wherein the radio-frequency communication is directed to terminate at a terrestrial base station. In some examples, operation 1004 can be implemented in a similar manner as operation 804 of FIG. 8.

After operation 1004, process flow 1000 moves to operation 1006.

Operation 1006 depicts encapsulating the radio-frequency communication with a packet header to produce an encapsulated communication, wherein the packet header corresponds to a first protocol and wherein the radio-frequency communication corresponds to a packet payload. In some examples, operation 1006 can be implemented in a similar manner as operations 810-814 of FIG. 8.

After operation 1006, process flow 1000 moves to operation 1008.

Operation 1008 depicts transmitting the encapsulated communication to a first satellite via an inter-satellite link, wherein the inter-satellite link comprises a communication mode, and wherein the first satellite is configured to transmit the radio-frequency communication to the terrestrial base station or to transmit the encapsulated communication to a second satellite. In some examples, operation 1008 can be implemented in a similar manner as operation 808 of FIG. 8.

In turn the second satellite can be configured to transmit the radio-frequency communication to a third satellite, and many such satellite hops can occur.

In some examples, the first satellite is configured to perform operations comprising de-encapsulating the encapsulated communication to produce a received communication; recovering data from the received communication to produce a recovered communication; converting the recovered communication to an analog domain to produce a recovered radio-frequency communication; and transmitting the recovered radio-frequency communication to the terrestrial base station. This can comprise an egress data path.

In some examples, transmitting the recovered radio-frequency communication to the terrestrial base station comprises transmitting the recovered radio-frequency communication via a radio unit.

In some examples, de-encapsulating the encapsulated communication comprises removing a header of the encapsulated communication from a payload of the encapsulated communication, and wherein the payload comprises the received communication.

In some examples, recovering the data from the received communication comprises recovering new radio samples from the received communication.

In some examples, a system that implements process flow 1000 omits a third generation partnership project protocol termination point. That is, a satellite can be configured for bent-pipe communications, but not with a gNB or other base station that allows terminating a 3GPP communication on the satellite.

After operation 1008, process flow 1000 moves to 1010, where process flow 1000 ends.

Example Operating Environment

In order to provide additional context for various embodiments described herein, FIG. 11 and the following discussion are intended to provide a brief, general description of a suitable computing environment 1100 in which the various embodiments of the embodiment described herein can be implemented.

For example, parts of computing environment 1100 can be used to implement one or more embodiments of UE 102A, UE 102B, TN 104A, TN 104B, NTN 106A, satellite 110A, satellite 110B, and/or satellite 110C.

In some examples, computing environment 1100 can implement one or more embodiments of the process flows of FIGS. 8-10 to facilitate a satellite communications tunneling protocol for a space mesh network.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per sc.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a nonvolatile storage such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples, and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term “processor” can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:

at least one processor; and at least one memory that stores executable instructions that, when executed by the at least one processor, facilitate performance of operations, comprising:

communicating, by a first satellite of a constellation of inter-satellite-linked satellites, with a user equipment according to a defined wireless communication protocol;

receiving a radio-frequency communication from the user equipment via a satellite service link, wherein the radio-frequency communication is directed to a ground non-terrestrial network gateway for termination at a terrestrial base station;

performing a programmable band-pass filter on the radio-frequency communication to produce a filtered communication;

performing an analog-to-digital conversion on the filtered communication to produce a digital communication;

creating a packet header for the digital communication;

encapsulating the digital communication with the packet header to produce an encapsulated digital communication; and transmitting the encapsulated digital communication to a first next-hop satellite of the constellation of inter-satellite-linked satellites via an inter-satellite link, wherein the inter-satellite link comprises a communication mode, and wherein the first next-hop satellite is configured to transmit the encapsulated digital communication to the terrestrial base station or to transmit the encapsulated digital communication to a second next-hop satellite of the constellation of inter-satellite-linked satellites.

2. The system of claim 1, wherein a last-hop satellite of the constellation of inter-satellite-linked satellites is configured to perform operations comprising:

receiving the encapsulated digital communication via the inter-satellite link;

de-encapsulating the encapsulated digital communication to produce a received digital communication;

recovering data from the received digital communication to produce a recovered digital communication;

converting the recovered digital communication to an analog domain to produce a recovered radio-frequency communication; and transmitting the recovered radio-frequency communication to the terrestrial base station.

3. The system of claim 2, wherein the operations further comprise:

converting the encapsulated digital communication from an optical or radio-frequency format to a digital format before performing the de-encapsulating.

4. The system of claim 1, wherein the defined wireless communication protocol is a third generation partnership project protocol, and wherein performing the programmable band-pass filter comprises passing a radio-frequency band that corresponds to the third generation partnership project protocol in the filtered communication.

5. The system of claim 4, wherein the radio-frequency band is a first radio-frequency band, and wherein the programmable band-pass filter comprises passing a mobile network operator frequency range 1 frequency band or a mobile network operator frequency range 2 frequency band in the filtered communication.

6. The system of claim 1, wherein performing the analog-to-digital conversion on the filtered communication comprises:

sampling the filtered communication to produce digital samples, wherein the digital communication comprises the digital samples.

7. The system of claim 1, wherein the encapsulated digital communication adheres to an internet protocol format, and wherein a payload of the encapsulated digital communication comprises adherence to a fifth generation new radio terrestrial wireless format.

8. The system of claim 1, wherein encapsulating the digital communication comprises inserting the digital communication into a transmission protocol payload portion of an internet protocol packet structure.

9. A method, comprising:

receiving, by a first satellite, a radio-frequency communication from a user equipment via a satellite service link, wherein the radio-frequency communication is directed to terminate at a terrestrial base station;

encapsulating, by the first satellite, the radio-frequency communication with a packet header to produce an encapsulated communication, wherein the packet header corresponds to a first protocol, and wherein the radio-frequency communication corresponds to an internet protocol frame payload; and transmitting, by the first satellite, the encapsulated communication to a second satellite via an inter-satellite link, wherein the inter-satellite link comprises a communication mode, and wherein the second satellite is configured to transmit the radio-frequency communication to the terrestrial base station or to transmit the encapsulated communication to a third satellite.

10. The method of claim 9, wherein the encapsulated communication comprises a fifth generation radio over internet protocol over 802.3 protocol communication.

11. The method of claim 9, wherein the encapsulated communication comprises a fifth generation radio over user datagram protocol over 802.3 protocol communication.

12. The method of claim 9, wherein the encapsulated communication comprises a fifth generation radio over layer two tunneling protocol over 802.3 protocol communication.

13. The method of claim 9, wherein transmitting the encapsulated communication to the second satellite via the inter-satellite link comprises:

transmitting the encapsulated communication in a radio-frequency over internet protocol tunneled format.

14. The method of claim 9, wherein transmitting the encapsulated communication to the second satellite via the inter-satellite link comprises:

transmitting the encapsulated communication in an optical format or a radio-frequency format.

15. A non-transitory computer-readable medium comprising instructions that, in response to execution, cause a system comprising at least one processor to perform operations, comprising:

receiving a radio-frequency communication from a user equipment on a satellite service link, wherein the radio-frequency communication is directed to terminate at a terrestrial base station;

encapsulating the radio-frequency communication with a packet header to produce an encapsulated communication, wherein the packet header corresponds to a first protocol and wherein the radio-frequency communication corresponds to a packet payload; and transmitting the encapsulated communication to a first satellite via an inter-satellite link, wherein the inter-satellite link comprises a communication mode, and wherein the first satellite is configured to transmit the radio-frequency communication to the terrestrial base station or to transmit the encapsulated communication to a second satellite.

16. The non-transitory computer-readable medium of claim 15, wherein the first satellite is configured to perform operations comprising:

de-encapsulating the encapsulated communication to produce a received communication;

recovering data from the received communication to produce a recovered communication;

converting the recovered communication to an analog domain to produce a recovered radio-frequency communication; and transmitting the recovered radio-frequency communication to the terrestrial base station.

17. The non-transitory computer-readable medium of claim 16, wherein de-encapsulating the encapsulated communication comprises:

removing a header of the encapsulated communication from a payload of the encapsulated communication, and wherein the payload comprises the received communication.

18. The non-transitory computer-readable medium of claim 16, wherein recovering the data from the received communication comprises:

recovering new radio samples from the received communication.

19. The non-transitory computer-readable medium of claim 16, wherein transmitting the recovered radio-frequency communication to the terrestrial base station comprises:

transmitting the recovered radio-frequency communication via a radio unit.

20. The non-transitory computer-readable medium of claim 15, wherein the system omits a third generation partnership project protocol termination point.

* * * * *